United States Patent
Chamblin

(12) 
(10) Patent No.: US 7,267,105 B1
(45) Date of Patent: Sep. 11, 2007

(54) OPTICALLY TRIGGERED ELECTRONIC DISTRIBUTOR FOR AN INTERNAL COMBUSTION ENGINE

(75) Inventor: Robert E. Chamblin, Palm Coast, FL (US)

(73) Assignee: Crane Cams Inc., Daytona Beach, FL (US)

( * ) Notice: Subject to any disclaimer, the term of this patent is extended or adjusted under 35 U.S.C. 154(b) by 0 days.

(21) Appl. No.: 11/154,981

(22) Filed: Jun. 16, 2005

Related U.S. Application Data

(60) Provisional application No. 60/582,465, filed on Jun. 24, 2004.

(51) Int. Cl.
    *F02P 5/15* (2006.01)
(52) U.S. Cl. .......... 123/406.59; 123/146.5 A; 123/406.65; 123/613
(58) Field of Classification Search ......... 123/146.5 A, 123/406.58–406.66, 613
See application file for complete search history.

(56) References Cited

U.S. PATENT DOCUMENTS

| | | | | |
|---|---|---|---|---|
| 3,969,614 A | * | 7/1976 | Moyer et al. ............... | 701/103 |
| 4,256,073 A | * | 3/1981 | Kobashi et al. ........ | 123/406.65 |
| 4,359,987 A | * | 11/1982 | Wesemeyer et al. ... | 123/406.65 |
| 4,547,852 A | * | 10/1985 | Kamifuji et al. ....... | 123/406.65 |
| 4,794,900 A | * | 1/1989 | Stubs et al. ............ | 123/406.64 |
| 4,843,558 A | * | 6/1989 | Bergmann et al. .......... | 701/101 |
| 5,433,184 A | * | 7/1995 | Kinoshita et al. ...... | 123/406.57 |
| 5,842,457 A | * | 12/1998 | Terakado et al. ........... | 123/613 |
| 6,119,669 A | * | 9/2000 | Yung .......................... | 123/643 |
| 7,040,286 B2 | * | 5/2006 | Campbell ................ | 123/406.6 |

* cited by examiner

*Primary Examiner*—T. M. Argenbright
(74) *Attorney, Agent, or Firm*—Drinker Biddle & Reath LLP

(57) ABSTRACT

A distributor for an internal combustion engine and associated methods comprise a camshaft having a drive gear thereon, a trigger disk positioned on the camshaft so as to rotate coaxially therewith, the trigger disk having a plurality of tabs defining a window between adjacent tabs, an optical sensor positioned relative to the trigger disk so that the plurality of tabs passes within sensor range as the trigger disk rotates on the camshaft, the sensor generating signals responsive to detection of the plurality of tabs, and a microprocessor operatively linked with the optical sensor and programmed with one or more ignition curves providing predetermined rates of ignition advance responsive to signals from the optical sensor.

23 Claims, 1 Drawing Sheet

OPTICALLY TRIGGERED ELECTRONIC DISTRIBUTOR FOR AN INTERNAL COMBUSTION ENGINE

RELATED APPLICATION

This application claims priority from co-pending provisional application Ser. No. 60/582,465 which was filed on Jun. 24, 2004, and which is incorporated herein by reference in its entirety.

FIELD OF THE INVENTION

This invention relates to internal combustion engines powered by gasoline and, more specifically, to an optically triggered distributor for distributing electrical power to the engine's cylinders.

BACKGROUND

As known in the art of internal combustion engines, a distributor is typically a rotary switch which directs a high-voltage ignition current in proper sequence to the various cylinders of the engine. In motor vehicles such as automobiles, the distributor generally includes an apparatus for timing the ignition to occur when each piston is at a predetermined position in the cycle, usually near the top of the cylinder. The apparatus usually includes breaker points, which are a set of cam-operated contacts which trigger the ignition pulse when opened. Timing of the opening of the breaker points is controlled by a diaphragm responsive to pressure in the engine's intake manifold so that timing is altered at higher engine speeds (RPM) and at higher engine loads.

Typical distributors in current use suffer from what is known as inductive hysteresis. This is a phenomenon in which ignition timing is retarded, rather than advanced, as engine speeds approach and exceed 7000 RPM. Conventional distributors rely on mechanical devices with a balance of forces including spinning weights working against spring tension causing a moveable plate to change the position of the triggering mechanism to achieve an engine-speed compensating ignition advance. The inaccuracies of springs (both in manufacture and due to wear from use) and the clearances necessary in the moveable mechanism prohibit the accuracy of ±½ A engine degree at most any engine speed.

BRIEF DESCRIPTION OF THE DRAWINGS

Accordingly, some of the features, advantages, and benefits of the present invention having been stated, others will become apparent as the description proceeds when taken in conjunction with the accompanying drawing, presented solely for exemplary purposes and not with intent to limit the invention thereto, and in which.

DETAILED DESCRIPTION

Figure 1:
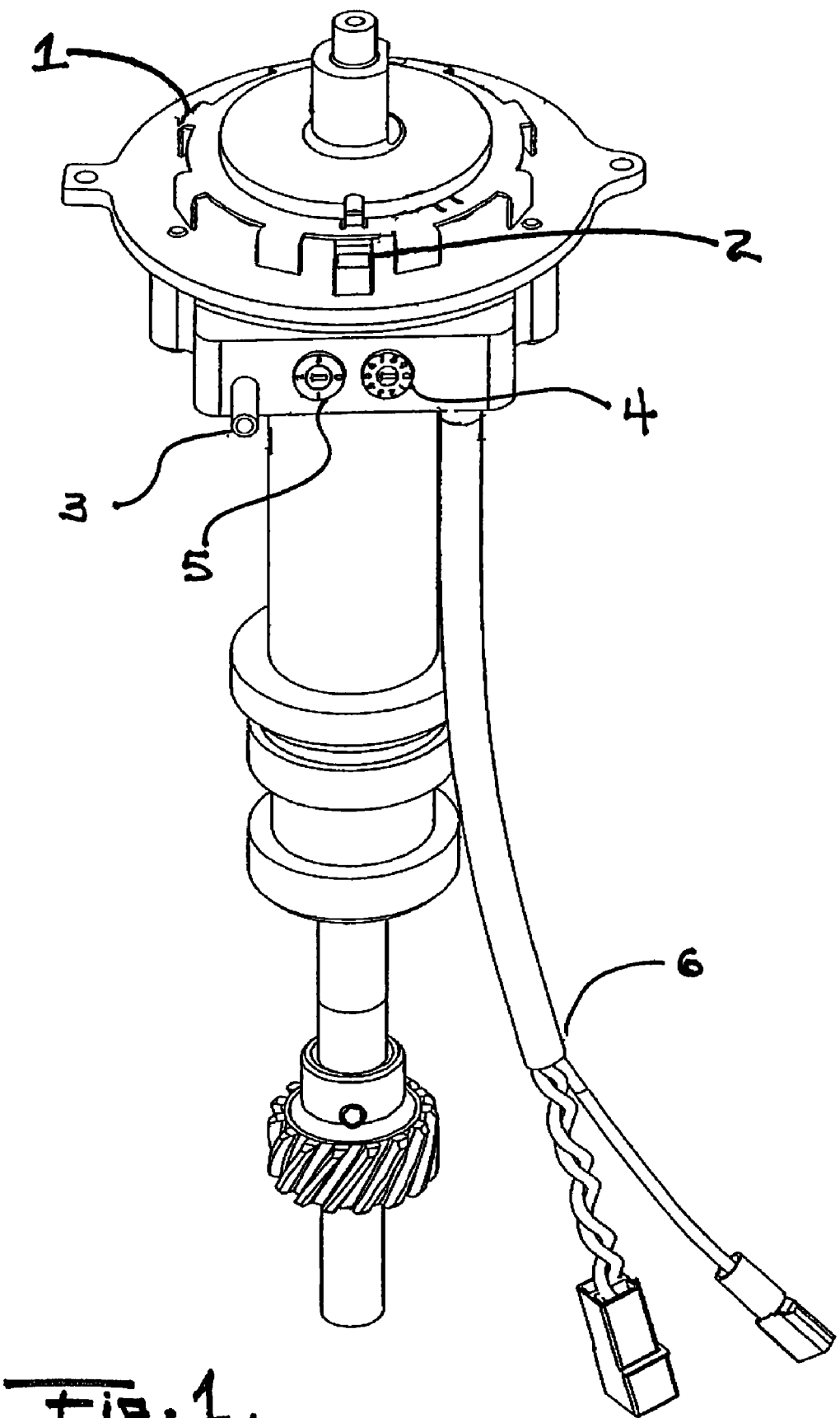
FIG. 1 shows an optically triggered distributor according to an embodiment of the present invention.

The present invention will now be described more fully hereinafter, in which description preferred embodiments of the invention are discussed. Unless otherwise defined, technical and scientific terms used herein have the same meaning as commonly understood by one of ordinary skill in the art to which this invention pertains. Although methods and materials similar or equivalent to those described herein can be used in the practice or testing of the present invention, suitable methods and materials are described below. In addition, the materials, methods and examples given are illustrative in nature only and not intended to be limiting. Accordingly, this invention may be embodied in many different forms and should not be construed as limited to the illustrated embodiments set forth herein. Rather, these illustrated embodiments are provided solely for exemplary purposes so that this disclosure will be thorough and complete, and will fully convey the scope of the invention to those skilled in the art. Other features and advantages of the invention will be apparent from the following detailed description, and from the claims.

The distributor illustrated in FIG. 1 according to the present invention is the first distributor to provide ±½ degree (crankshaft degrees) timing accuracy between cylinders at all engine speeds up to 10,000 RPM, and to enable the selection of electronically simulated, engine-speed compensating and engine-load compensating spark advance curves.

An optical triggering mechanism utilizing a light source and a shutter wheel provides an extremely accurate triggering system without the inductive hysteresis common to magnetic triggering mechanisms. As noted previously, inductive hysteresis causes ignition timing to retard as engine speeds increase. This undesired effect is especially noticeable at engine speeds above 7000 RPM.

The optical trigger of the present invention provides an extremely accurate timing to a microprocessor located in a module attached to the main housing of the distributor. The microprocessor has been preprogrammed with a variety of ignition "curves" that provide various pre-determined rates of ignition advance responsive to specific engine speeds. These different advance rates are selectable by means of a selection switch on the outside of the module. These are selected by turning the selection switch to one of ten different stops with a small screwdriver.

Different advance rates are necessary because different power-to-weight ratios, combustion chamber designs, and valve event timings, among other factors, determine how fast the ignition timing can advance with respect to engine speed. The ability to select among several engine-speed compensating advance curves provides tremendous flexibility in the use of the distributor. In fact, a "towing" curve could be selected and the distributor used in a vehicle towing a trailer with a race car enclosed. At the track, the distributor could be removed from the tow vehicle and installed in the race car and used competitively in a racing event simply by selecting the appropriate "race" curve with the selection switch. As known to the skilled, extremely accurate ignition timing is required for competitive racing engines. In fact, most current racing engines utilize crankshaft triggering sensors and remote computers to provide the timing accuracy available from the presently disclosed "street/race" ignition distributor.

In the present invention, included in the module attached to the bottom of the distributor there is a Manifold Absolute Pressure (MAP) sensor. The MAP sensor is connected to a vacuum source on the carburetor or fuel injection throttle body. The MAP sensor senses and sends data to the microprocessor about the engine load, which is a direct function of manifold vacuum. The microprocessor has been programmed with ignition advance "curves" that have been designed to provide additional ignition timing with increases in engine vacuum, that is, decreases in manifold pressure. Three different curves are available to compensate for changes in engine vacuum, of course, engine vacuum is an inverse function of engine load. These are selected by changing the position of a selection switch with a small screwdriver. Once this selection is made, ignition triggering is done electronically without any moving parts. By contrast, prior art ignition distributors utilize a vacuum diaphragm (pulling against an internal spring) to work on a moveable plate assembly that changes the position of the triggering mechanism. The inaccuracies of these prior art mechanisms further limit the total accuracy of the ignition event.

There have been previously described "electronic ignition distributors" that have used magnetic or optical triggering of the ignition signal. However, never before has an ignition distributor provided an assortment of electronically accurate, engine speed compensating advance "curves". There has never before been a distributor that used a MAP sensor to provide an engine-load compensating advance system, let alone a selection of advance rates to adapt the distributor to multiple applications. The ability to select from nine (9) engine speed compensating and three (3), engine load compensating ignition advance curves provides twenty-seven (27) ignition rate combinations to prospective users. This is all adjusted with a small screwdriver without any disassembly of parts or other inconvenience to the user. This flexibility, resulting from the innovative application of electronic technology, is a desirable feature of the presently disclosed ignition distributor.

In operation, and as illustrated in FIG. 1, the present distributor includes a trigger disk 1 which rotates about the shaft axis as the gear is turned by the camshaft. An optical sensor 2 detects the edges of tabs on trigger disk 1 and produces an electronic signal which is sent to the microprocessor. The microprocessor then calculates engine RPM by monitoring the time elapsed between sensing successive tab edges on trigger disk 1. The MAP sensor 3 is connected to an engine vacuum source and sends a voltage level to the microprocessor, which converts this voltage level to a numeric value proportional to the engine vacuum. RPM switch 4 and vacuum switch 5 positions are detected by the microprocessor and determine parameters for the microprocessor's calculating the appropriate advance value based on engine RPM and vacuum. The microprocessor calculates a delay interval and produces an output signal through connection 6 which triggers the ignition system to fire a spark.

In addition to the previously described features of the Crane Street/Race distributor, the use of the type of optical trigger used in the distributor offers unique capabilities that differentiate this distributor from any other distributor on the market. Using a specially designed communications dock (not shown) and dedicated software, the ignition module can be reprogrammed electro-optically through the optical trigger. This feature will permit the loading of custom ignition "curves" for a specific customer. In this manner, different distributors (for example, by part number) can be offered to different "engine builders/tuners". This enables these "engine builder/tuners" to offer specialized ignition components specially matched to the unique configuration of the engines they build. This unique tuning capability is not possible with "magnetic pickup" triggers or "hall-effect" triggers and is accomplished with a specialized programming "dock" designed for this purpose.

In the specification there have been disclosed typical preferred embodiments of the invention, and although specific terms are employed, the terms are used in a descriptive sense only and not for purposes of limitation. The invention has been described in some detail, but it will be apparent that various modifications and changes can be made within the spirit and scope of the invention as described in the foregoing specification and as defined in the appended claims.

What is claimed is:

1. A distributor for an internal combustion engine having a camshaft, comprising:
   a shaft having a drive gear adapted for connecting to the engine's camshaft;
   a trigger disk positioned on said shaft so as to rotate coaxially therewith, said trigger disk having thereon a plurality of tabs;
   an optical sensor positioned relative to said trigger disk so that said plurality of tabs passes within sensor range as said trigger disk rotates, said sensor generating signals responsive to sensing of said plurality of tabs;
   a manifold absolute pressure sensor operably connected to sense intake manifold absolute pressure in the internal combustion engine;
   a microprocessor operatively linked with said optical sensor and with said manifold absolute pressure sensor and programmed with one or more engine load compensating ignition curves and one or more engine speed compensating ignition curves for calculating predetermined rates of ignition advance responsive to signals from the optical sensor and the manifold absolute pressure sensor;
   a first selector operably linked with said microprocessor for manually selecting one of said engine load compensating ignition curves; and
   a second selector operably linked with said microprocessor for manually selecting one of said engine speed compensating ignition curves.

2. The distributor of claim 1, wherein said selectors comprise manually operable switches.

3. The distributor of claim 1, wherein said optical sensor further comprises a light source.

4. The distributor of claim 1, wherein the engine comprises a fuel delivery system having a carburetor or a fuel injection throttle body and wherein said distributor further comprises a manifold absolute pressure monitor connected to a vacuum source selected from the carburetor and the fuel injection throttle and said manifold absolute pressure monitor generates an engine load signal responsive to the vacuum source.

5. The distributor of claim 1, wherein said microprocessor is programmed with at least three ignition curves compensating for engine load.

6. The distributor of claim 1, wherein said microprocessor is programmed with at least nine ignition curves compensating for engine speed.

7. A distributor for an internal combustion engine having a camshaft, an ignition system and a fuel delivery system including a carburetor or a fuel injection throttle body, said distributor comprising:
   a trigger connectable to the engine camshaft so as to be rotatably driven thereby, said trigger having a plurality of spaced apart optically detectable features;
   an optical sensor fixed adjacent said trigger, said sensor generating an engine speed signal responsive to detection of at least a portion of one or more optically detectable features;
   a manifold absolute pressure sensor operably connected to a vacuum source selected from the carburetor and the fuel injection throttle body, said manifold absolute pressure sensor generating an engine load signal responsive to the vacuum source;
   a microprocessor operatively linked with said optical sensor, with said manifold absolute pressure sensor and with the engine's ignition system, said microprocessor programmable with a plurality of engine load compensating ignition curves and a plurality of engine speed compensating ignition curves to control timing in the engine's ignition system responsive to signals from said sensors;

a first selector operably linked with said microprocessor to manually select an engine load compensating ignition curve from said plurality of engine load compensating ignition curves; and a second selector operably linked with said microprocessor to manually select an engine speed compensating ignition curve from said plurality of engine speed compensating ignition curves.

8. The distributor of claim 7, wherein said selectors comprise manually operable switches.

9. The distributor of claim 7, wherein said optical sensor further comprises a light source.

10. The distributor of claim 7, wherein said microprocessor is programmed with at least three ignition curves compensating for engine load.

11. The distributor of claim 7, wherein said microprocessor is programmed with at least nine ignition curves compensating for engine speed.

12. A method of controlling ignition advance in an internal combustion engine having a camshaft, an ignition system and a fuel delivery system including a carburetor or a fuel injection throttle body, the method comprising:

storing a plurality of engine load compensating ignition advance curves and a plurality of engine speed compensating ignition curves in a computer readable medium;

sensing engine camshaft rotation;

calculating engine speed responsive to camshaft sensing;

generating an engine speed signal after calculating;

sensing manifold absolute pressure in a vacuum source associated with the carburetor or the fuel injection throttle body;

generating an engine load signal responsive to manifold sensing;

manually selecting an engine speed compensating ignition advance curve from the plurality of stored engine speed compensating ignition advance curves and an engine load compensating ignition advance curve from the plurality of stored engine load compensating ignition advance curves; and controlling ignition advance in the engine ignition system according to the ignition advance curves selected and responsive to sensing camshaft rotation and manifold absolute pressure.

13. The method of claim 12, wherein a microprocessor comprises the computer readable medium.

14. The method of claim 12, wherein the computer readable medium comprises a microprocessor.

15. The method of claim 12, wherein camshaft sensing is accomplished optically.

16. The method of claim 12, wherein selecting an ignition advance curve is accomplished by a manually actuated selector.

17. The method of claim 12, wherein controlling is effected by a microprocessor.

18. The method of claim 12, wherein controlling is effected by a microprocessor wherein the plurality of ignition advance curves are stored.

19. The method of claim 12, wherein controlling comprises approximately ±½ crankshaft degrees of timing accuracy between engine cylinders.

20. The method of claim 12, wherein controlling comprises approximately ±½ crankshaft degrees of timing accuracy between engine cylinders at engine speeds up to 10,000 RPM.

21. The distributor of claim 1, wherein the first and second selectors are mounted on the distributor and include indicators for indicating the selected curves.

22. The distributor of claim 1, further comprising a communications dock input port for adjusting or replacing one or more ignition curves.

23. The method of claim 12, further comprising:

connecting the distributor to a communications dock; and adjusting or replacing one or more ignition curves.

* * * * *